United States Patent

Wright

[15] 3,668,305

[45] June 6, 1972

[54] TELEVISION CAMERA REGISTRATION

[72] Inventor: Derek Thomas Wright, Crawley, England

[73] Assignee: The Marconi Company Limited, and Standard Telephones & Cables Limited, London, England

[22] Filed: Nov. 19, 1970

[21] Appl. No.: 90,991

[30] Foreign Application Priority Data

Nov. 24, 1969 Great Britain ....................57,451/69

[52] U.S. Cl. ....................178/5.4 M, 178/7.2

[51] Int. Cl. ....................H04n 9/08

[58] Field of Search ....................178/5.4 M, 7.2, 7.1, DIG. 25

[56] References Cited

UNITED STATES PATENTS

| | | | |
|---|---|---|---|
| 3,584,140 | 6/1971 | Kubota | 178/5.4 M |
| 3,536,824 | 10/1970 | Chmillon | 178/7.2 X |

*Primary Examiner*—Robert L. Richardson
*Attorney*—Kemon, Palmer & Estabrook

[57] ABSTRACT

To detect misregistration in the outputs of two or more television camera tubes, the outputs of the tubes are subtracted and differentiated, the resultant being integrated and rectified, and a minimum then being detected in the amplitude of the integrated and rectified signal. The differentiation is achieved by delaying the signals and subtracting the delayed from the undelayed signals, the delay being an incremental delay to detect misregistration in the line scan direction or equal to one or more line periods for the field scan direction.

10 Claims, 8 Drawing Figures

TELEVISION CAMERA REGISTRATION

This invention relates to the detection of television camera misregistration.

In color television cameras, the light from a scene is divided into three or four suitable components, having different spectral characteristics, which form images on separate camera tubes. The images are correctly registered when the output signals from each camera tube relating to any point in the scene are exactly coincident in time.

An object of the present invention is to provide apparatus capable of automatically providing an indication of the amount and sense of a registration error, so that correction of the error may be made.

According to the present invention there is provided a method of automatically detecting the misregistration of two television camera tubes which comprise the steps of subtracting and differentiating the outputs of the said tubes, in either order or simultaneously. The resultant signal is then rectified and integrated, and a minimum in the amplitude of the resultant is detected. Preferably said differentiation is achieved by delaying or storing the signals and subtracting the delayed from the undelayed signals. For detecting misregistration in the vertical (field-scan) direction the signals will be delayed or stored for a time equal to one or more line periods, while for detecting misregistration in the horizontal (line-scan) direction an incremental delay will normally be used.

The invention also provides a television camera including at least two television tubes, means for subtracting and differentiating the outputs of the tubes, means for rectifying the output of the subtracting and differentiating means, means for integrating the output of the rectifying means, and means for determining or indicating a minimum in the output of the integrating means.

Conveniently said subtracting and differentiating means is arranged to effect differentiation by a subtractive process, in which case subtraction and differentiation can take place simultaneously. Thus the differentiation may be achieved by delaying or storing the signals and subtracting the delayed from the undelayed signals.

In a preferred embodiment, said subtracting and differentiating means is connected to a first one of the tubes through a delay device. A second similar means is connected directly to the first tube and through a like delay device to the second tube. Further integrating means are connected to the output of the second subtracting and differentiating means, and the minimum determining or indication means is connected to the outputs of both integrating means. The last-mentioned means may then comprise a subtractor and means for detecting when the output of the subtractor passes through zero.

The camera may be used to scan a normal scene, and although the camera-tube output signals which are derived from the spectral components of the scene may have little or no correlation unless the colors concerned are of low saturation, for most general scenes there are, however, a large number of transitions in the separate output signals which are coincident in time when the camera is correctly registered.

The degree of coincidence between the transitions in the two output signals is found by subtracting one camera-tube signal from the other and then measuring the amount of "-detail" in the difference signal (this is equivalent to finding the difference between the separate detail components of the two signals). The result will be a minimum at the point of maximum coincidence of detail, i.e. at the point of best registration.

The apparatus can be utilized to produce an error detector which responds to the algebraic average of registration errors over, for example, a central area of the picture, the output indicating the presence of a mean displacement of one scanned image relative to another.

Various other objects and advantages of the present invention will become apparent from the following description taken with reference to the accompanying drawings, in which.

Figure 7A:
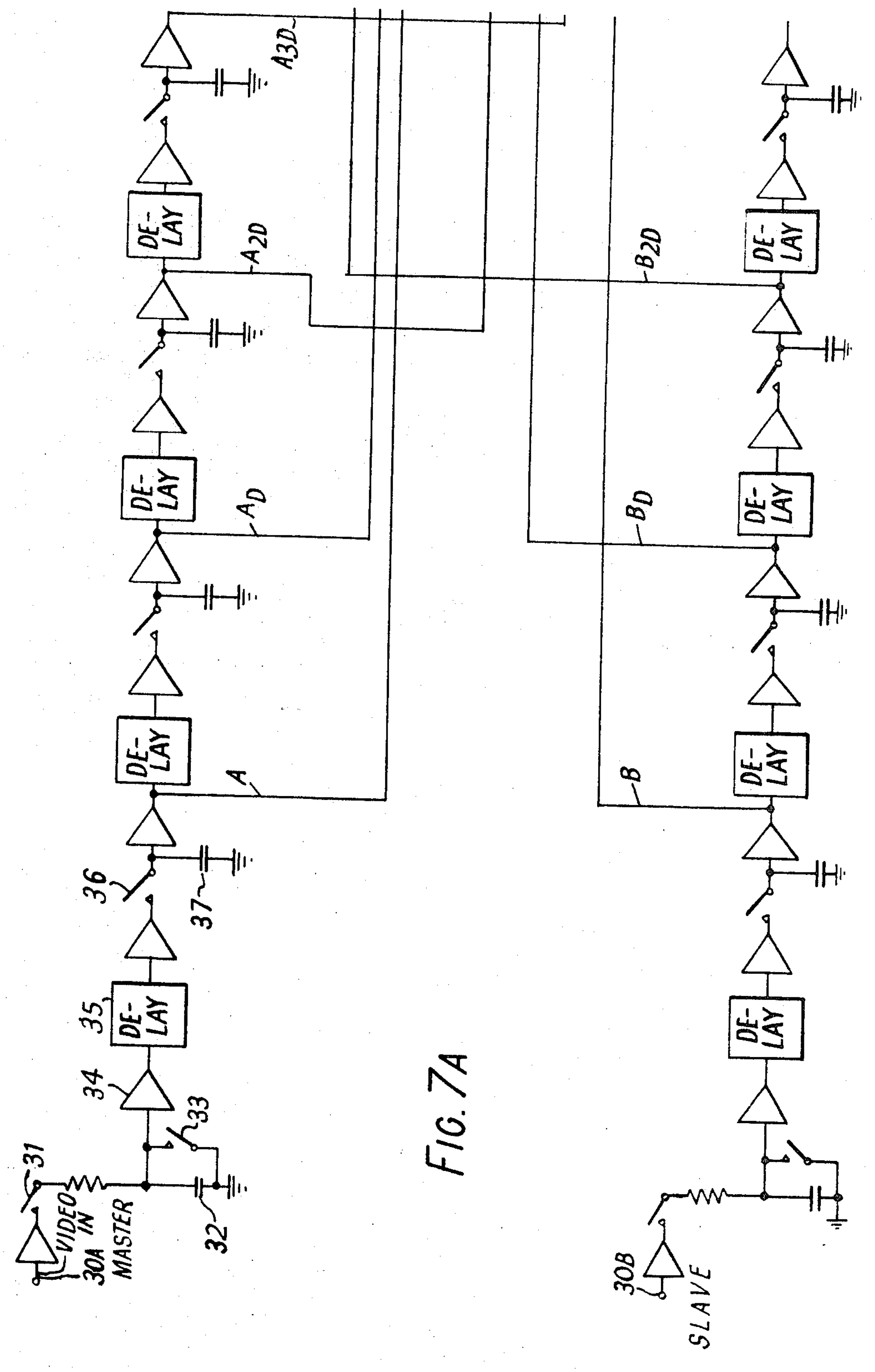
Figure 7B:
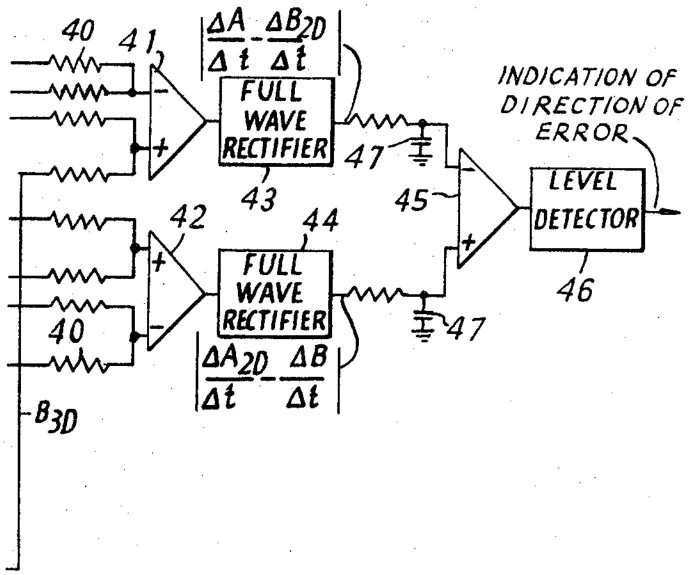
Figure 8:
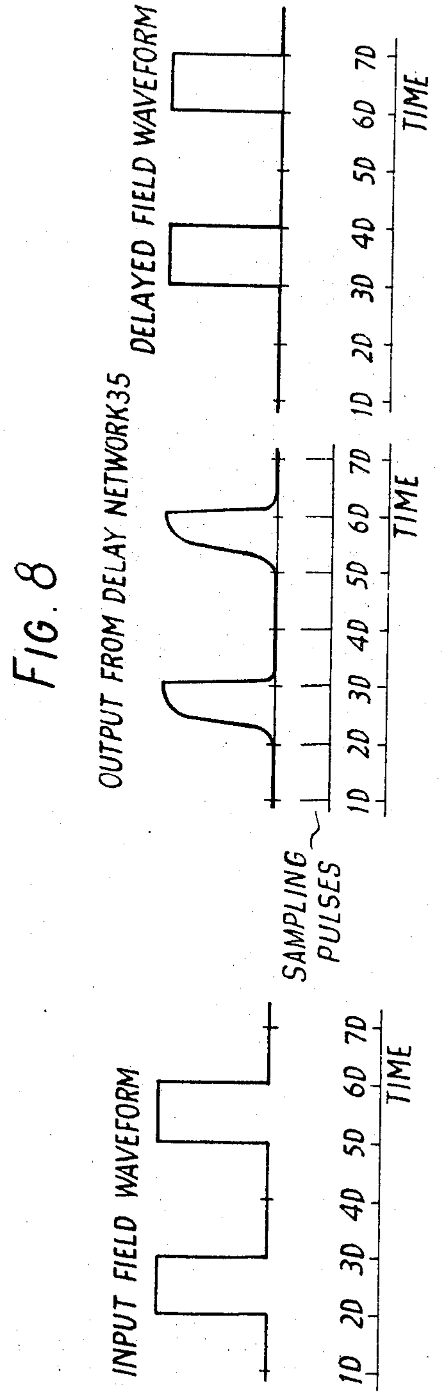

FIGS. 7A and 7B (which will hereinafter be referred to as FIG. 7) are a block circuit diagram of a vertical registration error detector system embodying the invention; and FIG. 8 shows timing diagrams illustrating the operation of the circuit of FIG. 7.

The apparatus to be described detects misregistration between the outputs of two color television camera tubes by subtracting the output of one camera tube from that of the other. An electronic measurement of the detail in the difference signal is then made by differentiating it, full-wave rectifying the derivative so that all the waveform excursions are of the same sign, and then integrating the resultant.

Figure 1:
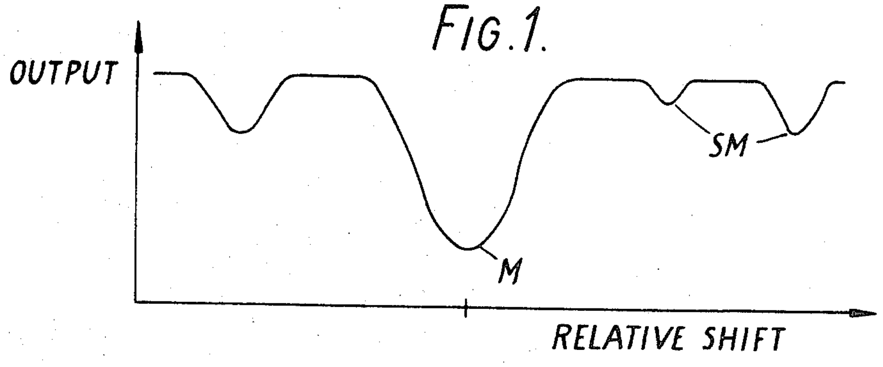
FIGS. 1, 2 and 3 show signal amplitudes plotted against relative horizontal shifts of two tubes.

FIG. 1 shows a typical response which might be so obtained if the horizontal scan of one tube is shifted through the point of registration with another tube. It will be seen that a marked minimum M occurs at the point of correct registration. With signals originating from a normal scene, other subsidiary minima SM may occur as some transitions of one signal register with non-corresponding transitions of the other signal. The effect of these unwanted minima can, however, be ignored provided their spacing from the main minimum is greater than the range of error detection required.

If the two signal inputs are respectively $A$ and $B$, then the difference signal which produces the response shown in FIG. 1 is $(A—B)$.

Since the response shown in FIG. 1 can give no indication of the direction of the registration error, it is necessary to produce an error signal of such a form that it indicates on which side of the point of correct registration the image lies. This is achieved by creating two separate responses and then amplifying the difference between them to produce an output. One response is derived after delaying signal B by a suitable period and then subtracting the delayed signal $B_T$ from signal A, while the other is derived after delaying signal A and subtracting the undelayed signal B from the delayed signal $A_T$. The responses due to these two difference signals $(A - B_T)$ and $(A_T - B)$ is shown in FIG. 2.

Figure 3:
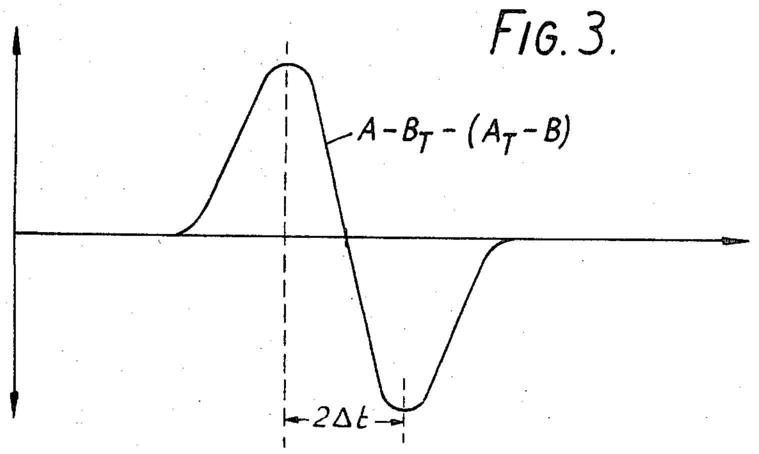

A direction-sensitive error signal is then produced by subtracting one of these responses from the other, the resulting output signal being as shown in FIG. 3. It can be seen that the output is zero at the point of correct registration and approximates to the derivative of the curve of FIG. 1.

Figure 2:
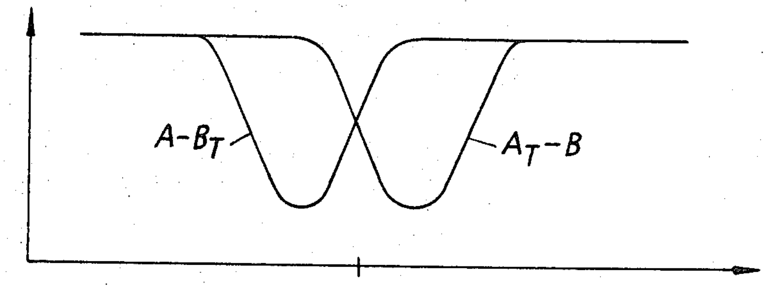

This arises because as shown in FIG. 2 the two offset responses are:

$$(A - B_T) \text{ and } (A_T - B)$$

where $A_T$ is signal $A$ delayed by time $T$, $B_T$ is signal $B$ delayed by time $T$, and one method of differentiating a signal $S$, where $S$ is a function of time $t$, is to take $\Delta S/\Delta t$, rather than $dS/dt$. This in practice may be realized as $(S - S_{\Delta t})$, where $S_{\Delta t}$ is the signal $S$ delayed by an increment of time, $\Delta t$.

A comparison between the frequency characteristic of this form of differentiator and that of a true derivative shows that, providing the frequency of maximum output $f_m$ $(=1/2\Delta t)$ is greater than the maximum frequency of the signal to be differentiated, the characteristics are broadly similar. The input signals are therefore passed through a low-pass filter having a sine-squared response and a cut-off frequency below $f_m$. This ensures the above condition whilst at the same time providing a useful protection against noise.

The derivatives of $(A - B_T)$ and $(A_T - B)$ may thus be generated as:

$$(A - B_T) - (A - B_T)_{\Delta t} \ldots \qquad 1.$$

and $$(A_T - B) - (A_T - B)_{\Delta t} \ldots \qquad 2.$$

These may be written $$A - B_T - A_{\Delta t} + B_{(T+\Delta t)} \ldots \quad 3.$$

$$A_T - B - A_{(T+\Delta t)} + B_{\Delta t} \ldots \quad 4.$$

For maximum sensitivity around the point of registration the two offset responses should intersect where their slopes, as seen in FIG. 3, are greatest. This approximately corresponds to their half-amplitude points. Since the half-amplitude width of each response is approximately equivalent to a shift given by a time delay of 2 $\Delta t$, and the spacing of the minima is $2T$, the value of T is preferably made equal to $\Delta t$. The resulting linear range of the output characteristic in FIG. 3 will now be approximately 2 $\Delta t$ and the overall useful range will be a little more than twice this.

The derivatives given by equations (3) and (4) now become:

$$A - B_{\Delta t} - A_{\Delta t} + B_{2\Delta t} \ldots \quad 5.$$

and $$A_{\Delta t} - B - A_{2\Delta t} + B_{\Delta t} \ldots \quad 6.$$

where $A_{\Delta t}$ and $B_{\Delta t}$ are signals A and B delayed by time $\Delta t$, $A_{2\Delta t}$ and $B_{2\Delta t}$ are signals $A$ and $B$ delayed by time $2\Delta t$.

Figure 4:
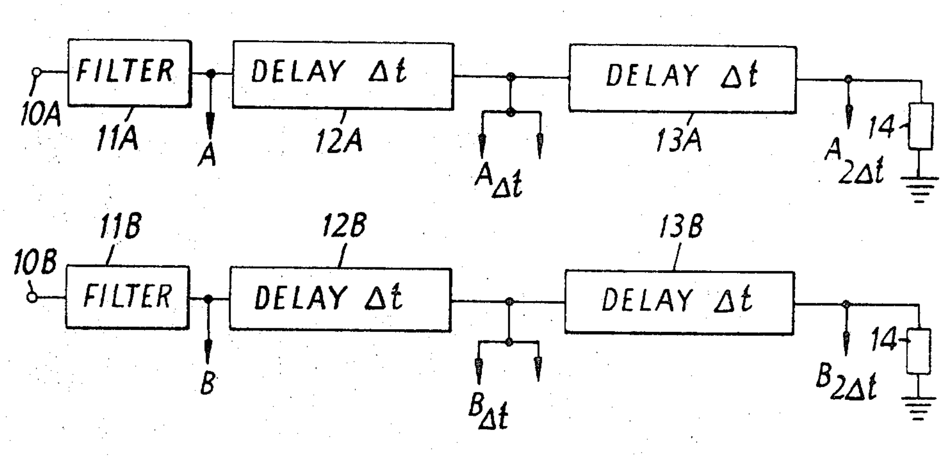
FIGS. 4 and 5 are circuit diagrams of a part of a first embodiment of the invention for detecting horizontal misregistration.
Figure 5:
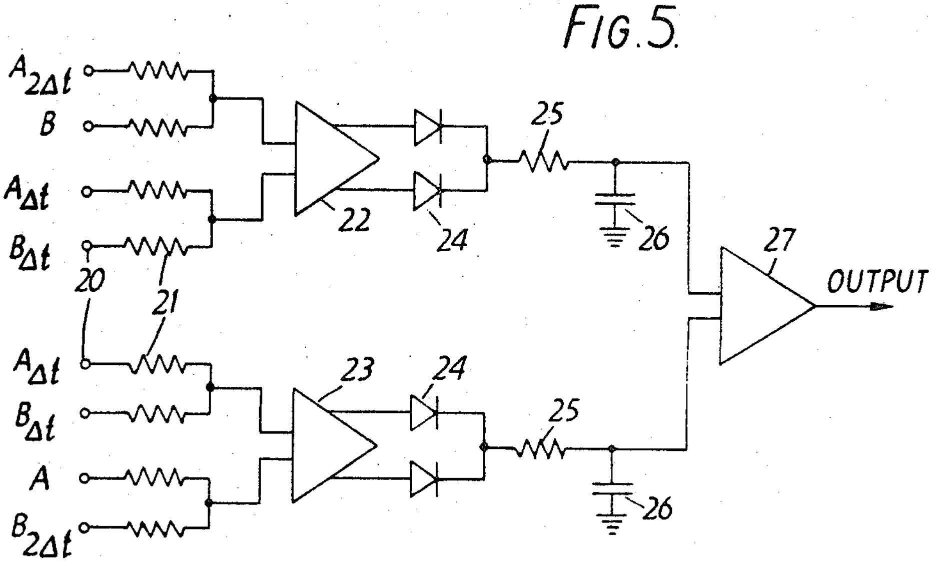

The apparatus shown in FIGS. 4 and 5 employs equations (5) and (6) and detects a horizontal offset between two camera tube outputs.

Two inputs 10A and 10B (FIG. 4) are connected to the camera tube outputs when the camera is viewing a normal scene, prior to any contour correction, matrixing or gamma-correction. These signals are passed through respective sine-squared low-pass filters 11A and 11B to produce signals A and B. The cut-off frequency of the filters $F_m = 1/2\Delta t$.

The signals A and B are each passed through two series-connected delay devices, 12A and 13A, and 12B and 13B. The outputs of these four delay devices are, respectively, $A_{\Delta t}$, $A_{2\Delta t}$, $B_{\Delta t}$ and $B_{2\Delta t}$. The delay devices 13A and 13B are terminated by terminations 14.

The output signals from the circuit of FIG. 4 are applied to the eight inputs 20 of the circuit of FIG. 5, as shown. The signals are applied through equal summing resistors 21, the resistance of which is high compared with the characteristic impedance of the delay devices, to generate the following sums:

$$A_{2\Delta t} + B$$
$$A_{\Delta t} + B_{\Delta t}$$
$$A_{\Delta t} + B_{\Delta t} \text{ and}$$
$$A + B_{2\Delta t}.$$

These sums are applied to the inputs of two differential amplifiers 22 and 23. The amplifiers 22 and 23 consist of long-tailed pair amplifiers the outputs of which are full-wave rectified by using the antiphase collector voltages of these amplifiers. The output of each rectifier 24 is integrated by a resistor 25 and capacitor 26. The capacitors act as integrators and the two integrals are fed to a high-gain differential amplifier 27.

The differential amplifiers 22 and 23 generate:

$$A_{\Delta t} + B_{\Delta t} - A_{2\Delta t} - B \text{ and}$$
$$A_{2\Delta t} + B - A_{\Delta t} - B_{\Delta t}$$

which are equations (6) and (5) respectively. These are each full-wave rectified to produce the modulus and then integrated by the capacitors 26. The differential amplifier 27 generates the difference between equations (6) and (5), which is of the form shown in FIG. 3.

Provided that the registration error is not greater than $\pm 2\Delta t$, the output of the amplifier 27 can be used to servo-control the picture registration, for example by adjusting the scanning circuits of one of the tubes.

The output of the circuit of FIG. 5 may be applied to two threshold detectors which take the form of Schmidt triggers. Since correct registration corresponds to zero output, one detector is set to change state when the output exceeds a predetermined positive potential, and the other is set to change state when the output exceeds a predetermined negative potential. These potentials may be referred to as the thresholds. Thus when the error output exceeds one of the thresholds, the appropriate detector changes state and causes a correction process to commence. The correction process then continues until the error output is reduced below the threshold.

One threshold detector could in theory be used to cause a motor to turn in one direction and the other to turn the motor in the opposite direction, and if the motor is coupled to the original shift control potentiometer of one of the two tubes, it would be easily arranged that the rotation of the motor adjusts the shift in such a direction as to reduce the error which initiated the correction process.

In practice the threshold detectors are used to cause a forward or reverse count in a digital binary counter which is connected to a digital-to-analogue converter. The output voltage of the digital-to-analogue converter is added to the shift potential derived from the original shift control potentiometer, by means of an operational amplifier. When there is no error neither of the threshold detectors is operative and the counter does not count, hence the output voltage of the digital-to-analogue converter is constant. (This is equivalent to the motor being stationary.)

When there is an error which exceeds a threshold, the counter counts up or down and the output of the digital-to-analogue converter is thus increased or decreased resulting in a change in the overall shift potential in the camera. This shifts the image of one tube until the error ceases to exist.

In a practical example, due to the quantizing nature of the counter and the digital-to-analogue converter, the shifting occurs in 10ns steps (0.02 percent of picture width), and the correction rate is of the order of 10 steps per second. Such correction steps are not subjectively visible.

Means may be provided for setting the counter to the middle of its range of correction (i.e. to mid-count) when the camera is initially manually registered. Should any long-term drift cause the counter, in correcting the drift, to reach the limit of its count, further correction is not possible and the shift must be manually reset.

The circuits of FIGS. 4 and 5 can be adapted for use in detecting vertical registration errors. In this case, each unit delay $\Delta t$ must be a multiple of 1 line period and such a system is illustrated in FIG. 7.

The system of FIG. 7 operates by producing what may be termed a "field waveform" (i.e. similar to the waveform which would be obtained by vertical scanning of the picture at the field frequency). The field waveform is obtained by a sampling technique, and a sampling technique is also employed to effect the delays required in the differentiation of the signals.

Thus, in order to resolve registration errors in the field-direction, a system of vertical scanning is simulated. For this purpose the line-period is divided into a number of preferably-equal time intervals. During each field period, one of these time intervals on every line is selected for sampling purposes, the interval selected commencing after a given delay with respect to the start of each line-period. These time intervals are defined by the output from a gating-pulse generator which, when displayed on a television monitor, appears as a vertical stripe on the picture. The width of this stripe is determined by the degree of line-period sub-division necessary for the effective functioning of the detector; in one example the width of this stripe was 4.5 microseconds. The signal obtained by sampling during each interval and integrating the resultant approximately represents the picture signal that would have been obtained had vertical scanning been used. The result of the integration is stored in a capacitor for 1 line-period, until the time when sampling and integration of information from the next line of the field takes place. The resulting field-waveform generated by such a sample-and-hold circuit consists of a series of amplitude-modulated pulses, each with a duration equal to 1 line-period. The master and slave camera tube outputs are separately treated in this way.

To extract detail from the field waveform, $V(t)$, the differential coefficient is generated as $\Delta V(t)/\Delta t$, where $\Delta t$ is equal to 1 line-period, D. In order to avoid the use of bulky delay lines, electronic sampling techniques are used to obtain the one-line delays necessary to secure the above differential. By subtracting the delayed and undelayed field waveforms the differential coefficient, $\Delta V(t)/\Delta t$, is obtained. An accumulative delay equal to a multiple of 1 line-period can be obtained in the field waveform by using a series of short delay and sample-andyhold circuits.

The field waveforms from the two camera tubes will again be designated as signals A and B respectively.

Figure 6:
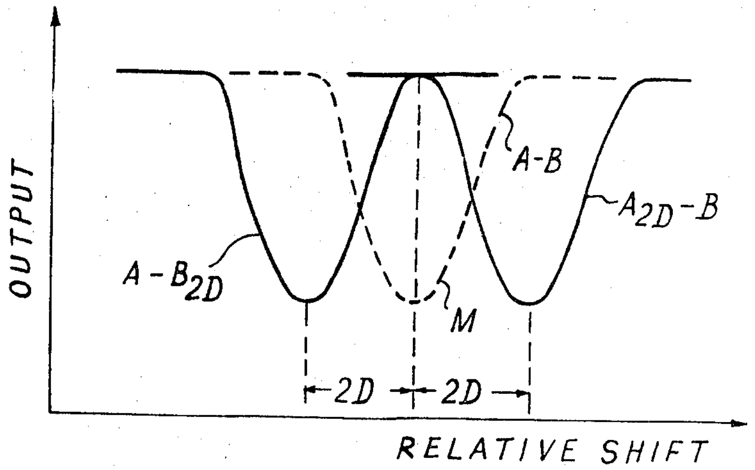
FIG. 6 shows signal amplitude plotted against relative vertical shifts of two tubes.

FIG. 6 illustrates the principle of operation of the system. The resultant, $$\left|\frac{\Delta A}{\Delta t}-\frac{\Delta B}{\Delta t}\right| dt,$$

of signals derived from the outputs of two camera tubes has a minimum M at the point of correct registration. Two difference signals $A - B_{2D}$ and $A_{2D} - B$ are again generated, where e.g. $A_{2D}$ is the signal A delayed by 2 line periods. As seen in FIG. 6, a two-line offset provides this form of detector with its maximum operating range. Linear interpolation between the pulses in the field waveform would enable the error detection range to be increased still further, as a three-line offset in the registration functions would then be possible.

The derivatives of the signals $A - B_{2D}$ and $A_{2D} - B$ are, respectively:

$$(A - B_{2D}) - (A - B_{2D})_D = (A + B_{3D}) - (A_D + B_{2D}) \ldots \quad 7.$$

$$(A_{2D} - B) - (A_{2D} - B)_D = (A_{2D} + B_D) - (A_{3D} + B) \ldots \quad 8.$$

These two derivatives are each full-wave rectified, integrated, and then subtracted from each other to provide an output signal which is dependent upon the registration error and which is zero when the error is zero.

As shown in FIG. 7, a preferred system comprises two video inputs 30A and 30B connected to the outputs of a master and a slave tube respectively. The input signals are similarly treated and only the upper half of FIG. 7 thus need be described in detail. Each input signal is sampled at a predetermined time during each line period by a switch 31 and the sample is stored in a capacitor 32 until the succeeding line. Immediately prior to each sample a switch 33 is closed to discharge the capacitor and reset the store to zero.

The output of an amplifier 34 connected to the capacitor 32 is the field waveform referred to above, and consists of a series of pulses the amplitude of which are proportional to the mean input signal amplitude during the immediately-preceding sampling period.

In order to obtain the signals $A$, $A_D$, $A_{2D}$ and $A_{3D}$, further sampling is employed. Thus the output of amplifier 34 is delayed by a short delay 35, re-sampled by a switch 36, and stored in a capacitor 37. The delay 35 may be a simple low-pass filter, and the switch 36 is operated by sampling pulses which recur at line frequency. The timing of the sampling pulses with respect to the field waveform after it leaves the short delay 35 is shown in FIG. 8. The re-sampling effected by the switch and capacitor 37 thus produces a delayed field waveform, which in the system illustrated, is treated as the signal $A$. A reset switch is not necessary for capacitor 37 as it can charge and discharge through the low output impedance of the preceding amplifier.

The process is repeated with further delays, sampling switches, and capacitor stores to produce the delayed signals $A_D$,$A_{2D}$and $A_{3D}$ as shown in FIG. 7.

The signals $A \ldots A_{3D}$ and $B \ldots B_{3D}$ thus obtained are combined through resistors 40 at the inputs of two differential amplifiers 41 and 42. The signals are combined as follows:

On the + input of amplifier 41 . . . $A + B_{3D}$
On the − input of amplifier 41 . . . $A_D + B_{2D}$
On the + input of amplifier 42 . . . $A_{2D} + B_D$
On the − input of amplifier 42 . . . $A_{3D} + B$ By comparison with expressions (7) and (8) above it will be seen that the outputs of the amplifiers 41 and 42 are equal to the differentials of $(A - B_{2D})$ and $(A_{2D} - B)$ respectively. These signals are full-wave rectified in respective rectifiers 43 and 44, then integrated by capacitors 47 and applied to the inputs of a differential amplifier 45. Any substantial departure from zero of the output of the amplifier 45 is detected by a level detector 46 and can be used to provide information for the correction of the registration error.

The use of the sampling techniques described, particularly for the generation of one-line delays, enables a compact, versatile and effective error detector to be developed. In particular, it should be noted that the system does not use any multiplicative processes which require relatively complex equipment.

The sampling switches shown in FIG. 7 and the reset switch 33 are controlled by a gating-pulse generator (not shown). The vertical stripe produced by the gating-pulse generator during one field represents only 1 scan of the simulated vertical scanning system, and if its position during the line-period were fixed it would only provide the detector with information from a small fraction of the total picture area. The detector should be capable of operating from normal television picture information. Consequently, if the field-waveform were generated from only a small fraction of this picture area, and this fraction happened to contain much fine color detail, this detail could be interpreted by the detector as a misregistration and spurious detector outputs would be generated. Also, by limiting the effective picture area, the chances of locating suitable field information for misregistration detection would be reduced, and the sensitivity of the detector impaired. It is preferred, therefore, that the simulation of a vertical scanning system should be complete. In order to do this, the sampling intervals selected on each line are moved, in the line-direction, to their next adjacent position (defined by the line-period sub-division) for each successive television field. As stated above, in one example the sampling interval was approximately 4.5 $\mu$s and consequently it took 12 television fields to traverse the active line period (52 $\mu$s). The simulated vertical scanning process therefore repeats once every 12 fields.

The area of the television picture which is scanned will, however, also be determined in the light of other factors. In particular, highly colored detail in the scene can have an appearance similar to that of a misregistered picture and can therefore be wrongly identified as misregistration. If this type of color detail is the only detail occupying a certain area of picture, and error detection is restricted to this same area, the error signal will consist entirely of spurious information. If, however, the area over which error detection is carried out is made sufficiently large so as to include some normal detail, then the effect of the spurious information will be accordingly reduced.

It is anticipated that color detail capable of creating spurious information will mainly be concentrated in small areas rather than be distributed evenly over the picture. On this basis it is preferable to carry out error detection over a large area of picture so as to reduce the probability of a high proportion of spurious information at the output.

If the system is based upon average registration errors over the whole picture it may be that errors which occur in one direction on one side of the picture are cancelled by others in the opposite direction on the other side of the picture. If there is some degree of unbalance between the amounts of error occurring in one direction and the other, an automatic "shift-correction" system could tend to remove the errors in the one area of the picture but increase the errors in the remaining area.

Changes in the distribution of detail over the picture area may thus result in variation of the compromise conditions of registration, and the maximum change of registration occurring in this way will be equal to the largest residual error. Since residual errors are usually much greater around the edges of the picture, the operation of the registration error detector could be inhibited in this region to provide a useful reduction in unwanted readjustments due to residual misregistration.

If the operation of the error detector is thus inhibited then the sensitivity, which is proportional to the area of picture used for error detection, will be reduced. Furthermore spurious indications due to color detail will become more significant, and in the limit, would mask the remaining sensitivity.

The picture area chosen for the error detection will thus be a compromise between, on the one hand, unwanted indications due to residual misregistration and, on the other, loss of sensitivity coupled with the increased significance of spurious signals due to color detail.

I claim:

1. In a television camera including at least two television tubes, the improvement comprising:

- means for subtracting and differentiating the outputs of said tubes;
- means for rectifying the output of said subtracting and differentiating means;
- means for integrating the output of said rectifying means; and
- means for determining or indicating a minimum in the output of said integrating means.

2. A camera according to claim 1, wherein said subtracting and differentiating means effects differentiation by delaying or storing the signals and subtraction by subtracting the delayed from the undelayed signals.

3. A camera according to claim 1, wherein said subtracting and differentiating means is connected to a first one of said tubes through a delay device, and comprising second subtracting and differentiating means connected directly to said first tube and through a delay device to said second tube, and further integrating means connected to the output of said second subtracting and differentiating means, said minimum determining or indicating means being connected to the outputs of both integrating means.

4. A camera according to claim 3, wherein said minimum determining or indicating means comprises a subtractor and means for detecting when the output of said subtractor passes through zero.

5. A camera according to claim 3, wherein the outputs of said tubes are $A$ and $B$, and the outputs of said two subtracting and differentiating means are, respectively, $$A - B_{\Delta t} - A_{\Delta t} + B_{2\Delta t}$$

$$A_{\Delta t} - B - A_{2\Delta t} + B_{\Delta t}, \text{ and}$$

where $A_{\Delta t}$ and $B_{\Delta t}$ are signals A and B delayed by a time $\Delta t$ and $A_{2\Delta t}$ and $B_{2\Delta t}$ are signals A and B delayed by a time $2\ \Delta t$.

6. A camera according to claim 5 wherein $\Delta t$ is a small fraction of a line period.

7. A camera according to claim 1, including a low-pass filter connected between each of said tubes and the or each subtracting and differentiating means.

8. A method of detecting the misregistration of two television camera tubes, comprising the steps of subtracting and differentiating the outputs of said tubes (in either order or simultaneously), rectifying the resultant signal, integrating the rectified signal and detecting a minimum in the amplitude of the resultant.

9. A method according to claim 8, wherein said differentiation is achieved by delaying or storing the signals and subtracting the delayed from the undelayed signals.

10. A method according to claim 9, wherein the signals are delayed or stored for a time equal to 1 or more line periods of the signals.

* * * * *